United States Patent [19]

Yamazaki et al.

[11] 4,430,116
[45] Feb. 7, 1984

[54] METHOD AND APPARATUS FOR HEATING OR HEATING AND REDUCTION RAW MATERIALS FOR A METALLURGICAL FURNACE UTILIZING WASTE GASES FROM THE SAME FURNACE

[75] Inventors: Shigeru Yamazaki, Kawasaki; Motoaki Hirao, Fujisawa; Tatuo Yamagishi, Urawa; Jun Nagai, Chiba; Hiroshi Ooi, Mitaka; Yoshinobu Shinozaki, Yokohama, all of Japan

[73] Assignees: Kawasaki Jukogyo Kabushiki Kaisha; Kawasaki Steel Corporation, both of Kobe, Japan

[21] Appl. No.: 209,178

[22] Filed: Nov. 21, 1980

[30] Foreign Application Priority Data

Nov. 22, 1979 [JP] Japan .............................. 54-151785

[51] Int. Cl.³ .................. C21B 13/02; C21B 13/14; C21C 5/32
[52] U.S. Cl. .................................... 75/34; 75/38; 75/60; 432/18; 432/163
[58] Field of Search .............. 75/38, 34, 44 R, 44 S, 75/60, 93 E; 266/44; 432/18, 19, 23, 26, 163, 164

[56] References Cited

U.S. PATENT DOCUMENTS

| | | | |
|---|---|---|---|
| 3,143,142 | 8/1964 | Okaniwa et al. | 75/60 |
| 3,301,664 | 1/1967 | Hall | 75/60 |
| 3,655,361 | 4/1972 | Brown et al. | 75/60 |
| 4,061,492 | 12/1977 | Fey et al. | 75/133.5 |
| 4,179,284 | 12/1979 | Weigel et al. | 75/38 |
| 4,238,226 | 12/1980 | Sanzenbacher et al. | 75/38 |
| 4,256,466 | 3/1981 | Braemer | 75/60 |

FOREIGN PATENT DOCUMENTS 2734962  2/1979  Fed. Rep. of Germany .......... 75/60

Primary Examiner—Michael L. Lewis
Attorney, Agent, or Firm—Jordan and Hamburg

[57] ABSTRACT

An apparatus for heating or heating and reduction raw material of a metallurgical furnace, utilizing high temperature waste gases which are released from the same furnace, has one or plural numbers of reactor(s) capable of holding the raw materials in the amount which can be charged in plural numbers of processing in the metallurgical furnace, where the reactor(s) is (are) disposed on a bypass passage connected to a pipe of a waste gas processing apparatus for cooling and scrubbing the waste gases from the metallurgical furnace. A part or all the waste gases are introduced into the reactor(s) and come into contact with the raw materials therein when the blowing in the furnace is performed to a full scale, and the reactor is cut off at the initial and final stage of blowing, whereby the heating or the heating and reduction raw material of a metallurgical furnace is effectively performed.

1 Claim, 6 Drawing Figures

FIG.I

METHOD AND APPARATUS FOR HEATING OR HEATING AND REDUCTION RAW MATERIALS FOR A METALLURGICAL FURNACE UTILIZING WASTE GASES FROM THE SAME FURNACE

BACKGROUND OF THE INVENTION

The present invention relates to a method of heating or heating and reduction raw materials to be charged into a metallurgical furnace, utilizing high temperaure waste gases which are released from the metallurgical furnace, and to an apparatus therefor.

In the production of steels by use of metallurgical furnaces, such as a converter, iron ores are first reduced in a blast furnace with the combustion of coke to form molten pig iron. The pig iron is placed in a metallurgical furnace and oxygen is blown into the furnace to produce steels. Hereafter this process is referred to as blowing process. In the blast furnace, a large amount of coke is consumed to melt and reduce iron ores. For instance, coke ranging from 400 to 500 kg is required for melting and reducing 1 ton of iron ores. This amounts to the greater part of the energy required for the steel industries. In order to produce high quality steels, the temperature at the time of tapping thereof has to be controlled properly. In order to control the temperature, iron ore and other materials are charged as coolant into the converter.

During the blowing process, waste gases containing CO gas at the temperature ranging from 1400° C. to 1600° C. are released from the metallurgical furnace. The waste gases are caught by a cooling apparatus and scrubbed by a wet type scrubber and then released into the air or recovered in a gas holder.

Conventionally, when the scrubbing is performed by the scrubber, the CO gas are directly cooled by scrubbing water. Therefore, the heat of the gases is wasted.

SUMMARY OF THE INVENTION

It is therefore an object of the present invention to provide a method of effectively utilizing the latent heat and sensible heat of the waste gases released from a metallurgical furnace, for heating and reducing raw materials to be charged into the metallurgical furnace, thereby decreasing the amount of iron ores to be charged into a blast furnace and economizing the overall energy required for steel industries, and to provide an apparatus capable of performing the method described above.

This object of the present invention is attained as follows: The waste gases are brought into contact with the raw materials to be charged into the metallurgical furnace, through a bypass pipe branched from a waste gas processing apparatus of the metallurgical furnace, with at least a reactor for heating and reducing the raw materials to be charged into the metallurgical furnace being provided. The blowing of the metallurgical furnace is performed intermittently at the intervals of about 40 minutes and when the concentration of CO gas in the waste gases are lower than a predetermined concentration at the initial stage and the final stage of the blowing, the inlet and outlet of the waste gases for the reactor are closed and inert gas may be fed into the reactor through an inert gas supply pipe connected to the reactor. When the concentration of CO gas in the waste gases is higher than a predetermined value during the full-scale blowing the waste gases are fed into the reactor, so that the raw materials are heated or heated and reduced. The raw materials are then charged into the metallurgical furnace through a pipe connecting a raw-material outlet of a bottom portion of the reactor to the metallurgical furnace.

It is preferable that the plural bypass passages are provided individually with a reactors capable of holding the amount of raw materials that to be used in one operation in the metallurgical furnace, with the number of the reactors corresponding to the number of processings of the converter, which requires to heat or heat and reduce the raw materials in one of the reactors to a predetermined extent. Thus, the raw materials which have been brought into contact with the waste gases for a predetermined time are successively supplied from each reactor into the metallurgical furnace.

Alternatively, such a reactor can be employed, which comprises a container made of a pair of gas permeable side walls for holding raw materials to be processed in the metallurgical furnace, and the waste gas passage which is disposed in such a manner as to pass zigzag through the raw material layer in the container, extending in the direction substantially normal to the permeable side walls, forming a plurality of waste gas paths which traverse the raw material layers in the direction from the raw material outlet to the inlet. In this reactor, each time one processing in the metallurgical furnace is finished, the raw materials filled in the bottom part of raw material layers taken out and supplied into the metallurgical furnace.

DETAILED DESCRIPTION OF THE PREFERRED EMBODIMENTS

Figure 1:
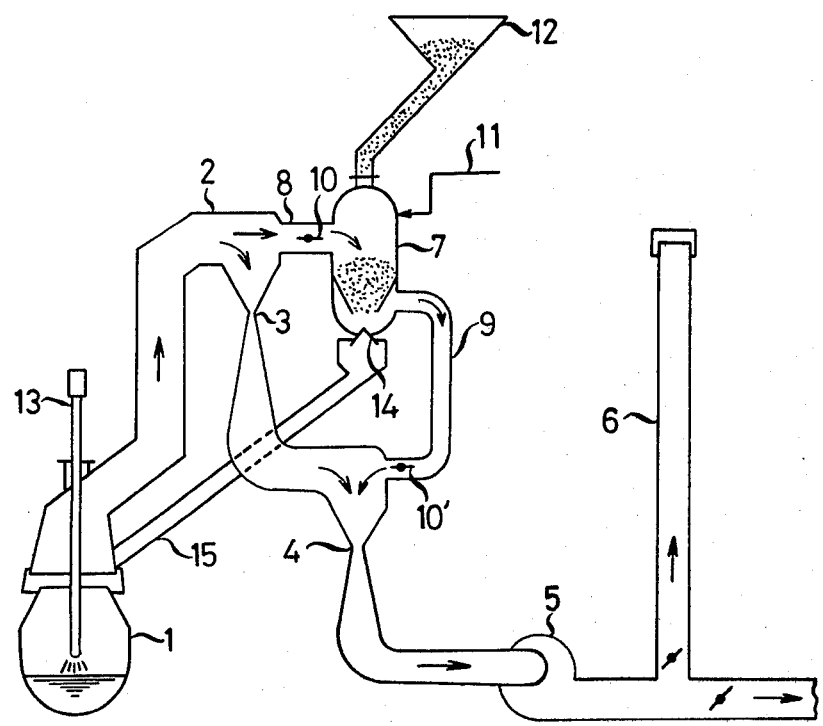
FIG. 1 is a diagrammatical view of an embodiment of a heating or heating and reduction apparatus according to the present invention.

Referring to FIG. 1, there is diagrammatically shown an embodiment of a heating and reduction apparatus according to the present invention. In the figure, the waste gases released from a converter 1 are cooled by a gas cooler 2 and are then scrubbed by a primary wet type scrubber 3 and then by a secondary wet type scrubber 4. The waste gases are then released into the air from a stack 6 by an induced draft fan 5 or are recovered in a gas holder (not shown). Between an outlet portion of the gas cooler 2 and an inlet portion of the secondary scrubber 4, there is disposed a bypass comprising a pipe portion 8 and a pipe portion 9. In the inlet portion of the pipe portion 8 and in the outlet portion of the pipe portion 9, there are respectively disposed dampers 10 and 10′. Between the pipe portions 8 and 9, there is disposed a reactor 7 for holding raw materials to be charged into the converter 1 and for heating or heating and reducing the raw materials.

Figure 2:
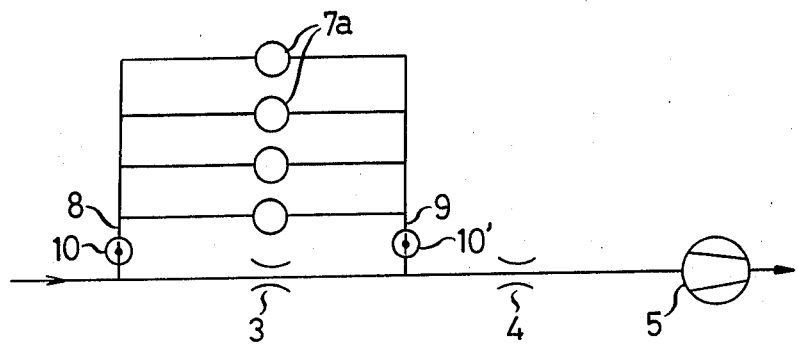
FIG. 2 is a block diagram of one arrangement of the reactors for use in the present invention.

As shown in FIG. 2, the reactor 7 consists of component reactors 7a which are disposed in a parallel way. The capacity of each component reactor 7a corresponds to the amount of raw materials that to be charged one processing in the converter 1, and the number of the component reactors 7a corresponds to the number of processings of the converter 1, which requires to heat or heat and reduce the raw material in one of the component reactors 7a to a predetermined extent.

As component reactors of the above-mentioned type, for instance, conventional gas-solid catalytic reactors, for instance, the reactor disclosed in Japanese Patent Publication No. 20446/1974 can be used, in which raw materials are packed between louver-like walls, and waste gases are caused to pass therethrough.

Figure 3:
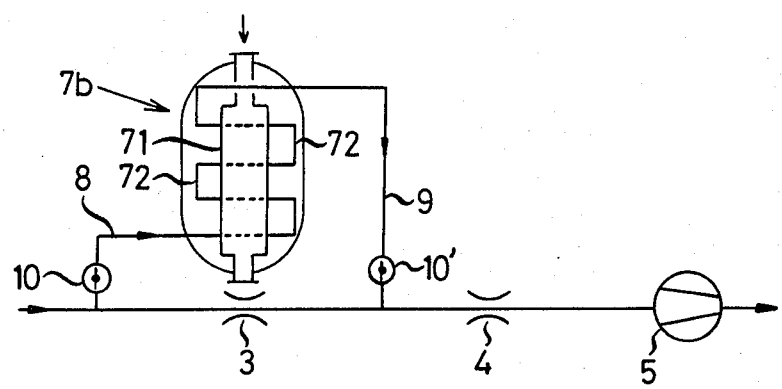
FIG. 3 is a block diagram of another arrangement of the reactors for use in the present invention.

Alternatively, a single reactor 7b as shown in FIG. 3 can be used, which comprises a container 71 having a pair of gas permeable walls and capable of holding a required amount of raw materials in layers corresponding to the amount of the raw materials that can be processed in several operations of the converter, and a waste gas passage which zigzag so as to pass the waste gases through the layers of the raw materials in the container 71, from the raw material inlet side to the raw material outlet side of the container 71 in the direction substantially normal to the gas permeable walls.

The construction of the reactor 7b will be described in more detail later.

The positions of the pipes 8 and 9 for the bypass are not necessarily limited to the positions between the outlet portion of the cooler 2 and the inlet portion of the secondary scrubber 4. The pipes 8 and 9 can disposed, for instance, between the cooler 2 and the inlet portion of the primary scrubber 3.

Referring back to FIG. 1, reference numeral 12 represents a hopper for supplying the raw materials into the reactor 7. Reference numeral 15 represents a pipe for introducing the heated or heated and reduced raw materials into the converter 1. Reference numeral 13 represents an oxygen blowing lance for blowing oxygen into the converter 1. Reference numeral 11 represents a pipe for supplying an inert gas into the reactor 7.

In the apparatus thus constructed, the raw materials are supplied into the reactor 7 from the hopper 12. The dampers 10 and 10' are closed, so that the inert gas is supplied into the reactor 7 through the pipe 11. In the meantime, oxygen is blown into the converter 1 from the oxygen blowing lance 13 to start the refining. The waste gases generated in the converter 1, in which the concentration of CO gas is rather low at the initial stage of the blowing process, are cooled by the gas cooler 2 and are then scrubbed by the primary scrubber 3 and then by the secondary scrubber 4 and are then released from the stack 6 by the induced draft fan 5. When the concentration of CO gas in the waste gases increases in the course of the full-scale refining, the dampers 10 and 10' are opened and, at the same time, the supply of the inert gas into the reactor 7 is stopped, so that all or part of the waste gases is introduced into the reactor 7, whereby the raw materials in the reactor 7 are heated or heated and reduced by the waste gases thus introduced.

Coarse dust particles are eliminated from the waste gases and, at the same time, the temperature of the waste gases is decreased by the raw materials placed in the reactor 7, and the waste gases are introduced into the inlet portion of the secondary scrubber 4 through the pipe 9. Thus introduced waste gases are scrubbed by the secondary scrubber 4 to become a useful gas, which is held in a gas holder (not shown). When the blowing comes to a final stage and the concentration of CO gas in the waste gases decreases, the dampers 10 and 10' are closed and, at the same time, the inert gas is supplied again to the reactor 7 through the pipe 11. The waste gases are released from the stack 6 after being scrubbed by the primary scrubber 3 and the secondary scrubber 4. Thus one refining cycle is completed.

The reduction condition of the raw materials in the reactor 7 is confirmed experimentally beforehand. By repeating the above-mentioned process in several times, the raw materials are heated or heated and reduced to a predetermined extent, so that the refining is completed.

In the case as shown in FIG. 2, where a plurality of component reactors 7a are disposed, in which the capacity of each component reactor 7a is equal to the amount of the raw materials that can be processed at one time in the converter 1 and the number of the component reactors 7a is equal to the number of the refining processes required, to heat or heat and reduce the raw materials in one of the reactors to a predetermined extent the raw materials are supplied to one of the component reactors 7a each time one processing in the converter 1 is finished, and the raw materials that have been processed by heating or heating and reducing the same in contact with the waste gases a required number of times are discharged from a gate 14 at the bottom of each component reactor 7a into the converter 1 through the pipe 15, whereby the converter 1 can be operated continuously.

Further, in the case where the reactor 7b as shown in FIG. 3 is employed, the amount of the raw materials that can be filled in each path for the waste gases, which traverses the raw material layers within the container 71, is set so as to be equal to the amount of the raw materials that can be processed at one time in the converter 1, and the number of the waste gas paths is selected to correspond to the number of the processings required for heating or heating and reducing the raw materials to the desired extent, and each time one processing is finished in the converter 1, one of the waste gas paths is opened and the raw materials are supplied therefrom into the converter 1, whereby the converter 1 can be operated continuously.

Figure 4:
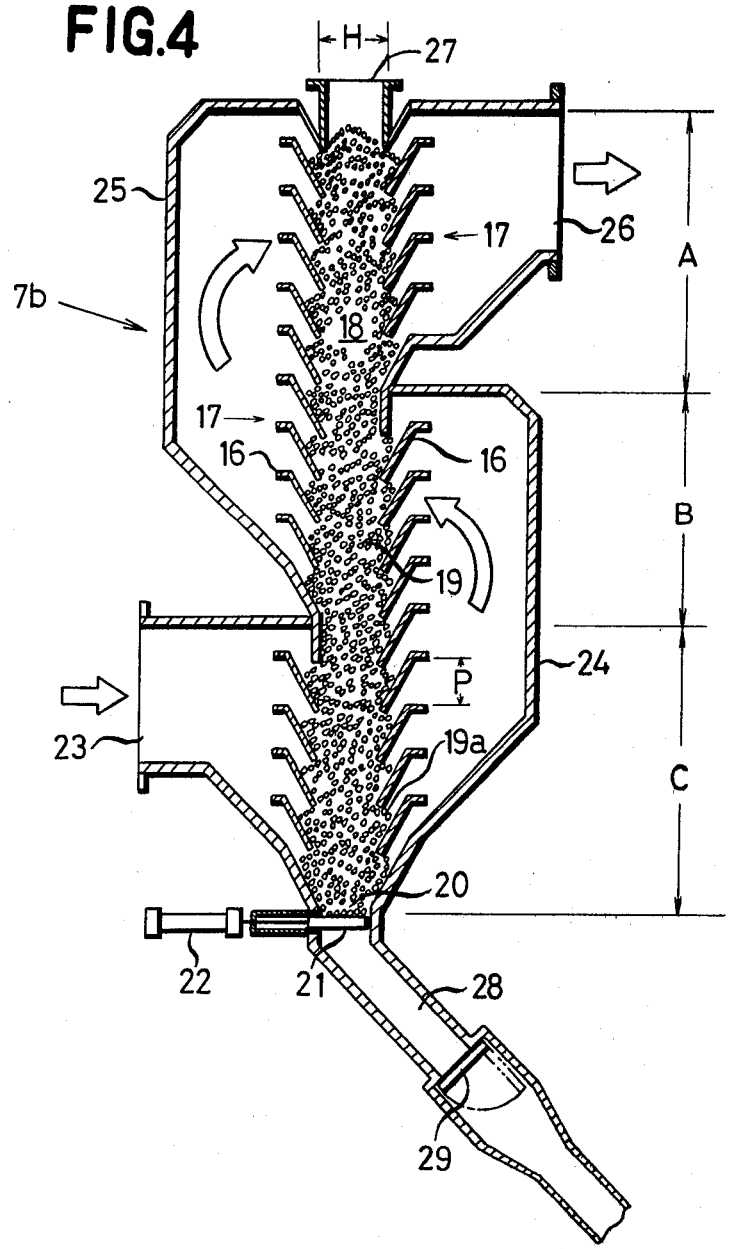
FIG. 4 is a cross section of a reactor comprising a container for holding raw materials, which is formed by gas permeable walls, and waste gas paths which are disposed so as to cross the container.
Figure 5:
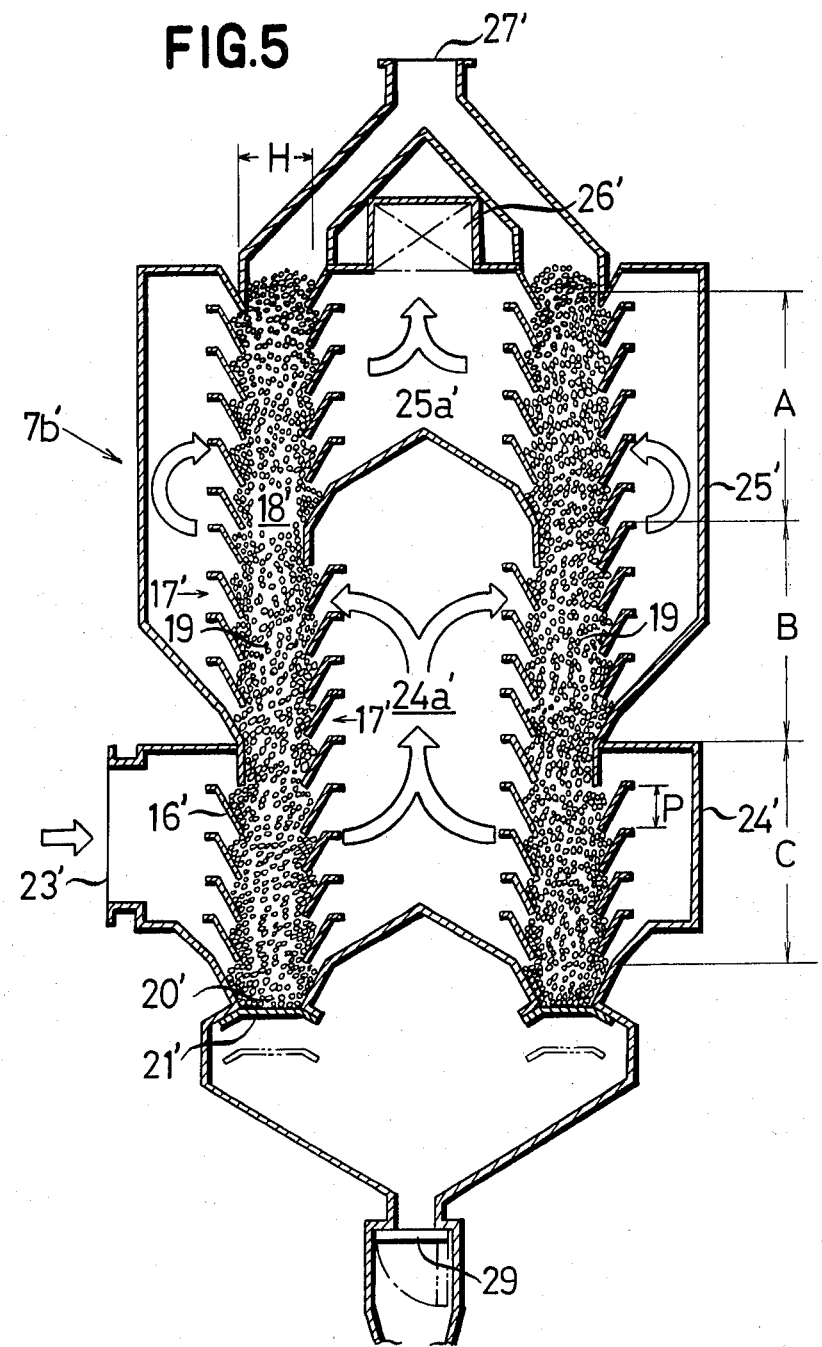
FIG. 5 is a cross section of a circular type reactor.
Figure 6:
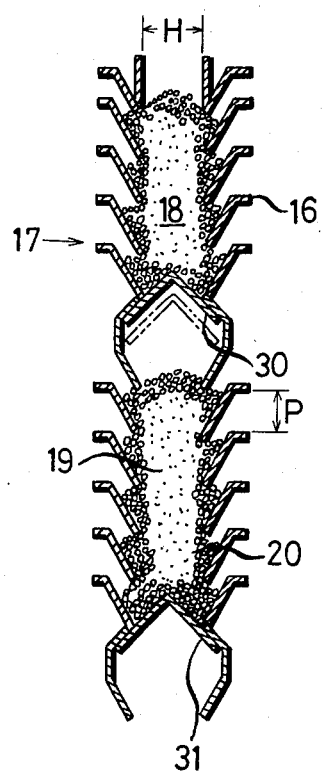
FIG. 6 is a cross section of an another reactor of the type described in FIGS. 4 and 5.

Referring to FIG. 4 to FIG. 6, the reactor of the above-mentioned type will now be explained in detail.

In the reactor 7b shown in FIG. 4, the louvers 16 are disposed at a predetermined pitch P with an inclination ranging from about 45° to 60° to form a pair of parallel, gas permeable, vertical walls 17, which constitute a vertically extending flat container 18. The container 18 is filled with iron ores 19 in layers. The surfaces 19a of the thus filled iron ores 19 which stay between the louvers 16 can form their respective angle of repose by properly adjusting the vertical length of each of the louvers 16 and the pitch P thereof. As a result, the iron ores can be packed uniformly, regardless of the upper layers or lower layers thereof, and the iron ores do not drop from the gaps of the louvers 16, whereby the container 18 can maintain its permeability while holding the iron ores therein. In the outlet portion 20 of the iron ore layers, a cut-off gate 21 is disposed, which can be opened and closed by a cylinder 22, whereby the iron ores 19 can be taken out from the bottom layer thereof. Reference numeral 23 represents a gas passage which is disposed on the side of the outlet for discharging the iron ores 19 and which allows the waste gases to pass through the iron ore layers at a plurality of times in the direction almost normal to the iron ore layers with the aid of blower boxes 24 and 25. An outlet 26 for discharging the waste gases is disposed on the side of an inlet 27 for charging the iron ores into the container 18. In this embodiment, the waste gas passage consists of three gas passage portions A, B and C so as to divide the iron ore layers into three. In an ore discharge path 28 which is connected to the outlet portion 20 for discharging the iron ores, a shield gate 29 is disposed which prevent air from entering the reactor 7b when the blowing is not conducted.

Referring to FIG. 5, there is shown another embodiment of a heating and reduction apparatus according to the present invention. In the reactor 7b' of this embodiment, louvers 16' are disposed vertically at a predetermined pitch as in the embodiment shown in FIG. 4, and a pair of large and small, concentric, vertical, cylindrical gas permeable walls 17' are formed, so that a container 18' for holding the iron ores therein is formed between the two cylindrical walls 17'. A waste gas inlet 23' is disposed on an outside portion of an iron ore outlet 20', and the waste gases are caused to pass through a portion C of the iron ore layers in the direction normal to the walls 17' by a blower box 24' which encircles the outer cylindrical gas permeable wall 17'. The waste gases pass through the inner wall 17' and enter a cylindrical inner space 24a' of the inner wall 17' and then pass through a portion B of the iron ore layers located above the portion C and reach a blower box 25' which encircles the portion B. The waste gases pass through a portion A of the iron ore layers and reach a space 25a' located above the space 24a' and are then discharged from the waste gas outlet 26' into the pipe 9. The other portions of this embodiment are the same in construction as those of the embodiment shown in FIG. 4.

Referring to FIG. 6, there is shown part of a further embodiment of a heating and reduction apparatus according to the present invention. More specifically, in the figure, there is shown a cross section of a container 18 which corresponds to the flat type container 18 or the cylindrical type container 18' in FIG. 4 and FIG. 5, respectively. The other portions of the embodiment in FIG. 6 are not shown, but are the same as those in the embodiments in FIG. 4 and FIG. 5. In this embodiment, a cut-off gate 30 is provided in the boundary between each waste gas passage which traverses the iron ore layers 19, and further there is provided another cut-off gate 31 in the iron ore discharge portion.

The operation of the thus constructed reactors in the above-mentioned three embodiments according to the present invention will now be explained. It is supposed that the thickness of the iron ore layer is H and that the number of the waste gas passages is three, A, B, and C, in accordance with the number of the refining operations in the metallurgical furnace, which requires in order to heat or perform heating and reduction of the iron ores to a predetermined extent in each reactor. The amount of the iron ores that can be filled in one waste gas passage is determined in conformity with the amount of iron ores that can be processed at one time in the metallurgical furnace.

In operation, the cut-off gate 21, 21' is closed and the iron ores 19 are packed in the container 18, 18' through the inlet 27, 27' so as to form an iron ore layer. Hot gases, which are generated when the blowing is performed to the full scale, enter the waste gas inlet 23, 23' and first heat the iron ores present in the area C nearest the iron ore outlet and the iron ores in the waste gas passage B, and then the iron ores in the waste gas passage A, so that the waste gases are discharged from the waste gas outlet 26, 26'. Thus, the iron ores in the waste gas passage C on the side of the outlet of the iron ores are heated to the highest temperatures, and the iron ores in the waste gas passage B to the lower temperatures and the iron ores in the waste gas passage A to the lowest temperatures.

In the initial operation, when three refining operations have been completed in the metallurgical furnace, the iron ores in the waste gas passage C are reduced to a predetermined extent at predetermined temperatures. Therefore, when the third refining operation has been completed, the cut-off gate 21, 21' is opened, so that the iron ores that have been heated and reduced at the predetermined temperatures are taken out, and the cut-off gate 21, 21' is then closed. At the moment, the iron ores located in the waste gas passage B are moved down to the waste gas passage C, while the iron ores located in the waste gas passage A are moved down to the gas passage B. Therefore, new iron ores are supplied to the waste gas passage A from the inlet 27, 27'. The iron ores that have been moved down to the waste gas passage C have already been heated and reduced to the second step, and during the fourth operation by the metallurgical furnace, the iron ores are heated and reduced to the predetermined extent. When the fourth operation of the metalllurgical furnace has been completed, the cut-off gate 21, 21' is opened and the iron ores in the waste gas passage C are taken out as mentioned previously. At the same time, the iron ores located at the position of the waste gas passage B are moved down to the position of the waste gas passage C, and the iron ores located at the position of the waste gas passage A are moved down to the position of the waste gas passage B, and iron ores 19 are supplied into the waste gas passage A. Thus, the iron ores 18 are continuously heated to the predetermined temperatures and reduced, and the heated and reduced iron ores are supplied into the metallurgical furnace at each operation. In the apparatus shown in FIG. 6, the cut-off gate 30 is disposed in the boundary between each waste gas passage. Therefore, by opening and closing the cut-off gate 31, and the cut-off gate 30 at the next step, the iron ores can be removed in a shield state.

According to the present invention, the reduction of the raw materials in the reactors can be accelerated by the waste gases containing rich CO gas when the blowing is performed to the full scale, and the waste gases in the reactors are replaced with an inert gas so as to prevent the raw materials in the reactors from being oxidized in the initial and final stages of the blowing process, whereby the reduction of the raw materials is efficiently done and the heat of the waste gases is effectively utilized by placing the heated or reduced raw materials directly into the metallurgical furnace, so that the energy required for steel industries is significantly economized. Furthermore, since the raw materials placed in the metallurgical furnace are heated or heated and reduced, the amount of the iron ores that can be charged in the metallurgical furnace can be significantly increased in comparison with the conventional method in which the iron ores are employed as the cooling material from the view point of the heat balance during the refining process, so that the amount of the molten pig iron from the blast furnace and the amount of the scrap which serves as a sub-raw material can be decreased and accordingly the cost of the raw steels per unit weight can be decreased.

Furthermore, according to the present invention, the waste gases which are explosive can be released safely or recovered in the form of useful gases, without impairing the conventional waste gas processing apparatus.

What is claimed is:

1. A heating or a heating and reduction method for heating or heating and reducing raw material to be charged into a metallurgical furnace, comprising the steps of
   (A) supplying said raw material which is to be charged into a metallurgical furnace, into a reactor which is interposed in a bypass means connected to a waste gas pipe of said metallurgical furnace,
   (B) closing a waste gas inlet and a waste gas outlet of said reactor along said bypass at an initial stage of blowing of said furnace, to shut off the flow of waste gas through said reactor, and supplying inert gas to said reactor to prevent the raw material from being oxidized,
   (C) opening the waste gas inlet and waste gas outlet of said reactor when blowing of said furnace is performed to full-scale, to introduce at least a part of the waste gas into said reactor to bring the waste gas into contact with the raw material for heating or heating and reduction of the raw material,
   (D) closing the waste gas inlet and waste gas outlet of said reactor along said bypass at the final stage of blowing of said furnace, and supplying inert gas to said reactor to prevent the raw material from being oxidized,
   (E) repeating steps (B), (C) and (D), until the raw material is heated or heated and reduced to a predetermined extent, and
   (F) opening a raw material outlet of said reactor to charge the raw material into said metallurgical furnace.

* * * * *